(12) United States Patent
Ikeda

(10) Patent No.: US 7,751,615 B2
(45) Date of Patent: Jul. 6, 2010

(54) IMAGE PROCESSING APPARATUS AND IMAGE PROCESSING METHOD FOR CHANGING COLOR OF PUPIL IN PHOTOGRAPHIC IMAGE

(75) Inventor: Eiichiro Ikeda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 936 days.

(21) Appl. No.: 11/146,803

(22) Filed: Jun. 7, 2005

(65) Prior Publication Data

US 2005/0275734 A1 Dec. 15, 2005

(30) Foreign Application Priority Data

Jun. 14, 2004 (JP) ............... 2004-176184

(51) Int. Cl.
*G06K 9/00* (2006.01)
(52) U.S. Cl. ............... 382/163; 348/246; 382/118; 382/167; 382/274; 382/275
(58) Field of Classification Search ............... None
See application file for complete search history.

(56) References Cited

U.S. PATENT DOCUMENTS 5,982,912 A * 11/1999 Fukui et al. ............... 382/118

| 2002/0015514 | A1* | 2/2002 | Kinjo ............... 382/118 |
| 2002/0150306 | A1* | 10/2002 | Baron ............... 382/275 |
| 2003/0021478 | A1 | 1/2003 | Yoshida |
| 2004/0041924 | A1* | 3/2004 | White et al. ............... 348/239 |
| 2004/0119851 | A1* | 6/2004 | Kaku ............... 348/239 |
| 2005/0024516 | A1* | 2/2005 | Fish et al. ............... 348/333.03 |
| 2005/0129331 | A1 | 6/2005 | Kakiuchi et al. |
| 2005/0275734 | A1 | 12/2005 | Ikeda |

FOREIGN PATENT DOCUMENTS

JP 2000-305141 11/2000
JP 2003-179807 6/2003

* cited by examiner

*Primary Examiner*—Sinh Tran
*Assistant Examiner*—Paul Berardesca
(74) *Attorney, Agent, or Firm*—Cowan, Liebowitz & Latman, P.C.

(57) ABSTRACT

An image processing apparatus includes a detector for detecting a first color of eyes of a subject included in a first image, based on the first image that is generated by photography, and a changer for changing the first color of eyes into a second color different from the first color, wherein the changer changes to the second color based on characteristic information indicative of a characteristic of the subject, the characteristic information being generated from the first image.

4 Claims, 7 Drawing Sheets

| PERSONAL INFORMATION | |
|---|---|
| | NAME |
| | COLOR OF EYES |
| | GROUP INFORMATION |
| | COLOR OF EYES ACCORDING TO GROUP |
| | CHARACTERISTIC INFORMATION |
| |     DISTANCE BETWEEN EYES |
| |     DISTANCE BETWEEN EYEBROWS |
| |     PROFILE OF FACE |
| |     SHAPE OF NOSE |
| |     SHAPE OF MOUTH |
| |     COLOR OF SKIN |
| |     . |
| |     . |
| |     . |
| |     etc. |
| | ADDRESS OF CORRESPONDING IMAGE |
| | . |
| | . |
| | . |
| | etc. |

FIG. 4

IMAGE PROCESSING APPARATUS AND IMAGE PROCESSING METHOD FOR CHANGING COLOR OF PUPIL IN PHOTOGRAPHIC IMAGE

CROSS-REFERENCE TO RELATED APPLICATIONS

This application claims priority to Japanese Patent Application No. 2004-176184, filed on Jun. 14, 2004. The entire contents of that application are incorporated herein by reference.

BACKGROUND OF THE INVENTION

The present invention relates to the processing technology of images obtained by an image-taking apparatus, such as a digital camera, a digital video camera and a camera phone.

In taking a picture of a subject person in a dark place, an image-taking apparatus, such as a digital camera, a digital video camera and a camera phone, lights a flashbulb as the illumination light. The pupils of the his eyes are dilated in the dark place, and the flash reflected on the retina's capillary often causes so-called redeye in which the person's eyes appear in red. One proposed image-taking apparatus illuminates the subject just before photography and contracts the pupils, so as to prevent the light reflected on the retina's capillary from reaching the image-taking apparatus and mitigate the redeye.

One problem of this image-taking apparatus is that the desired effect is not available unless the subject gazes the redeye easing light.

Accordingly, Japanese Patent Application, Publication No. 2004-145287 discloses the technology that processes red-eyed images and corrects the redeye. This technology detects human eyes in a shot image using the computer software (or program), determines whether or not the pupils are red-eyed, and corrects the redeye using a predetermined color conversion process.

While the above redeye correction using the software can eliminates the redeye from the images, this technology has a problem in that a true color of the subject's eyes is not reproduced. The color of human eyes varies among individuals, such as a person of blue eyes and a person of brown eyes. The predetermined color conversion process to everyone to correct the redeye causes an incorrect reproduction of the color of eyes.

While it is generally possible to change the color of eyes in the shot image using the image-processing software, the software user selects the changing color and no automatic redeye correction is available.

BRIEF SUMMARY OF THE INVENTION

One illustrative object of the present invention is to provide an image processing apparatus that automatically corrects redeye in shot images to a true color of subject' eyes.

The present invention has been made in consideration of the above situation, and has as its object to reproduce, when the color of person's eyes in a shot image is not a true color, the color of his eyes based on his characteristic information included in the image.

According to the present invention, the foregoing object is attained by providing an image processing apparatus that includes a detector for detecting a first color of eyes of a subject included in a first image, based on the first image that is generated by photography, and a changer for changing the first color of eyes into a second color different from the first color, wherein the changer changes to the second color based on characteristic information indicative of a characteristic of the subject, the characteristic information being generated from the first image.

According to the present invention, the foregoing object is attained by providing an image processing apparatus that includes a detector for detecting a first color of eyes of a subject included in a first image, based on the first image that is generated by photography using first illumination light, and a changer for changing the first color of eyes into a second color different from the first color, wherein the changer detects a color of eyes of the subject included in a second image that is generated by photography using second illumination light that has a smaller emission dose than that of the first illumination light or by photography without the first illumination light, and sets to the second color the color that has been detected.

According to the present invention, the foregoing object is attained by providing an image-taking apparatus that includes a detector for detecting a first color of eyes of a subject included in a first image, based on the first image that is generated by photography, a changer for changing the first color of eyes into a second color different from the first color, and a characteristic information generator for generating characteristic information indicative of a characteristic of the subject based on the first image, wherein the changer changes to the second color based on the characteristic information.

According to the present invention, the foregoing object is attained by providing an image-taking apparatus that includes a detector for detecting a first color of eyes of a subject included in a first image, based on the first image that is generated by photography using first illumination light, and a changer for changing the first color of eyes into a second color different from the first color, wherein the changer detects a color of eyes of the subject included in a second image that is generated by photography using second illumination light that has a smaller emission dose than that of the first illumination light or by photography without the first illumination light, and to the second color sets the color that has been detected.

According to the present invention, the foregoing object is attained by providing an image-taking apparatus that includes an image generating apparatus for generating a first image by photographing a subject, a detector for detecting a first color of eyes of a person included in a first image, and an alarm for giving an alarm when the first color of eyes is detected.

According to the present invention, the foregoing object is attained by providing an image processing method for an image processing apparatus, which includes the steps of detecting a first color of eyes of a subject included in a first image, based on the first image that is generated by photography, changing the first color of eyes into a second color different from the first color, and generating characteristic information indicative of a characteristic of the subject based on the first image, wherein the changing step changes to the second color based on the characteristic information.

According to the present invention, the foregoing object is attained by providing an image processing method for an image processing apparatus, which includes the steps of detecting a first color of eyes of a subject included in a first image, based on the first image that is generated by photography using first illumination light, and changing the first color of eyes into a second color different from the first color, wherein the changing step detects a color of eyes of the subject included in a second image that is generated by photography using second illumination light that has a smaller emission dose than that of the first illumination light or by photography without the first illumination light, and sets to the second color the color that has been detected.

A program for enabling a computer to execute the above method and a recording medium for storing the program and for enabling a computer to read the program also constitute another aspect of the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention:

FIG. 4 is a chart of a structure of personal information in the image-taking apparatus according to the first embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
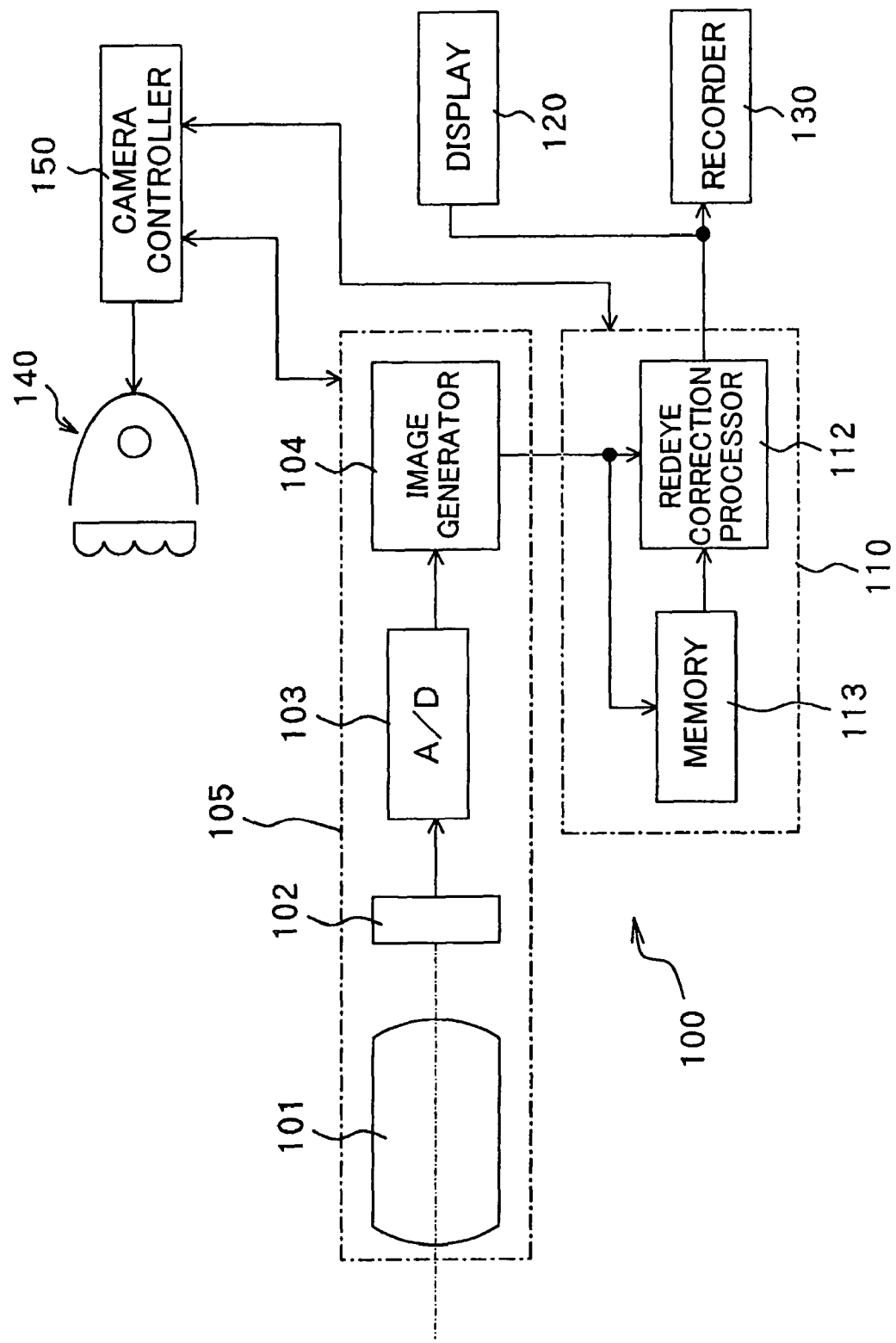
FIG. 1 is a block diagram of a structure of an image-taking apparatus as one exemplary image processing apparatus according to a first embodiment of the present invention.

FIG. 1 is a block diagram of a structure of an image-taking apparatus 100 as one exemplary image processing apparatus of this embodiment. While the image-taking apparatus 100 is an apparatus that can serve as a digital camera, a digital video camera and a camera phone, this embodiment discusses the image-taking apparatus of a digital camera as an example. In FIG. 1, 101 denotes an image-taking lens part. 102 denotes a photoelectrically converting image-pickup device, such as a CCD sensor and a CMOS sensor, which photoelectrically converts a subject image formed by the image-taking lens part 101.

103 denotes a A/D converter that A/D converts an output signal from the image-pickup device 102. 104 denotes an image generator that generates an image signal (simply referred to as an "image" hereinafter) by providing various processes to a digital signal from the A/D converter.

112 denotes a redeye correction processor that corrects the redeye in an image generated by the image generator 104. 113 is a memory that stores the image generated by the image generator 104 and other information, such as characteristic information and personal information.

The image-pickup apparatus 100 shown in FIG. 1 integrates the image generator 105 that generates an image using an image-pickup device 102 with an image processing apparatus 110 that corrects the redeye. 120 denotes a display, such as a liquid crystal display, which indicates an image outputted from the image generator 104 or the redeye-corrected image outputted from the redeye correction processor 112. 130 denotes a recorder that writes an image outputted from the image generator 104 or a redeye-corrected image outputted from the redeye correction processor 112 in a recording medium, such as a semiconductor memory, an optical disc and a magnetic disc, and reads an image from the recording medium.

140 denotes an illumination unit that irradiates the flashlight as the illumination light onto the subject. 150 denotes a camera controller that governs control over the entire image-taking apparatus 100 that includes the image generator 105, the image processing apparatus 110 and the illumination unit 140.

Figure 2:
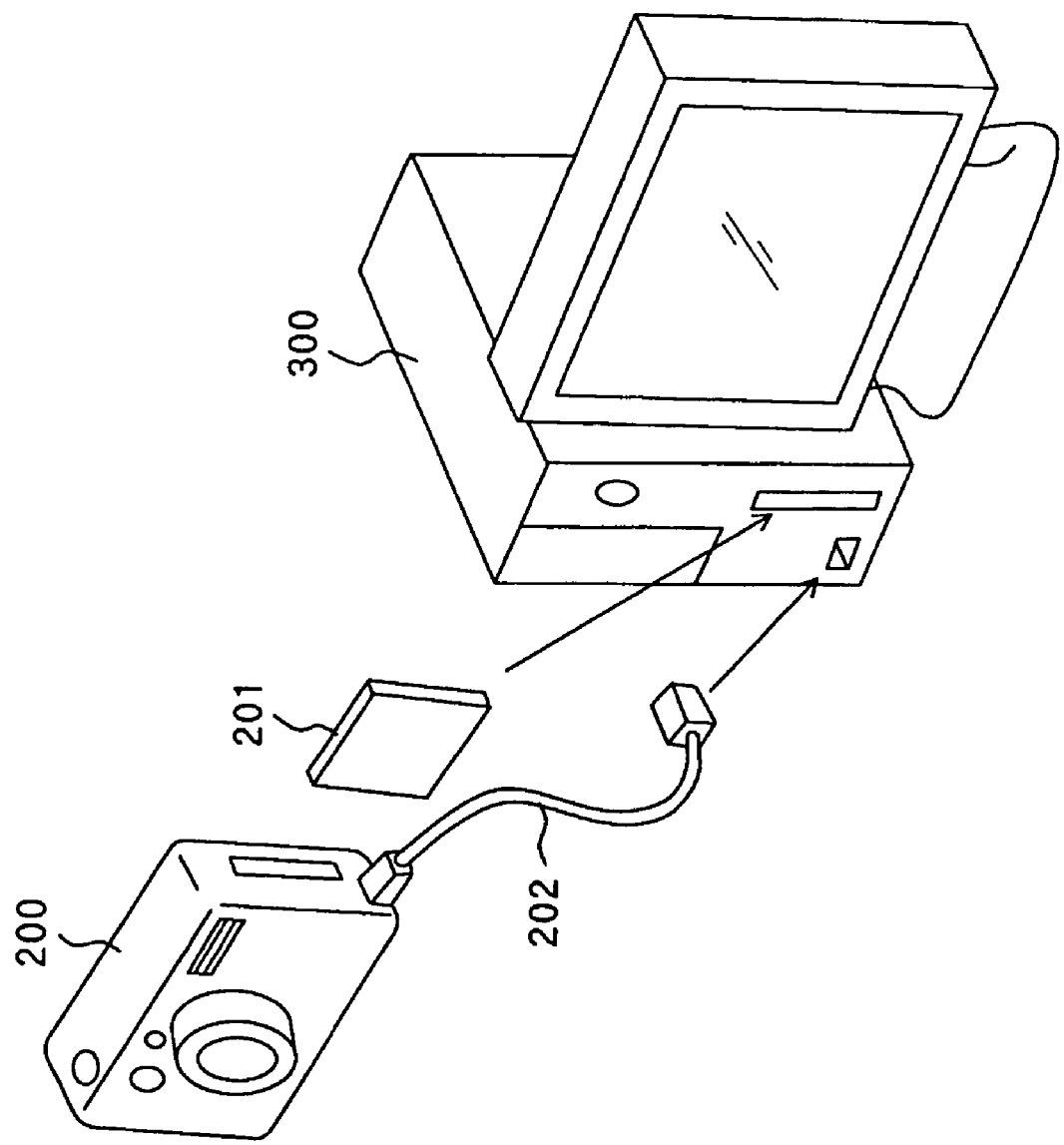
FIG. 2 is view of a personal computer as one exemplary image processing apparatus according to the first embodiment of the present invention.

FIG. 2 is a view of a personal computer ("PC") 300 as one illustrative image generator of this embodiment. An image-taking apparatus 200, such as a digital camera, a digital video camera and a camera phone, generates an image of the subject. This image is recorded in a recording medium 201, or output to an external device, via a cable 202 or a wireless apparatus (not shown).

The PC 300 can read an image from the recording medium 201 that stores the image, for example, when the recording medium 201 is inserted into a slot, or directly takes in the image from the image-taking apparatus 200 via the cable 202.

In the PC 300, the internal CPU and an image processing program that is installed in a hard disc drive ("HDD") or a memory mainly serve as the redeye correction processor 112 and the memory 113 shown in FIG. 1.

Figure 3:
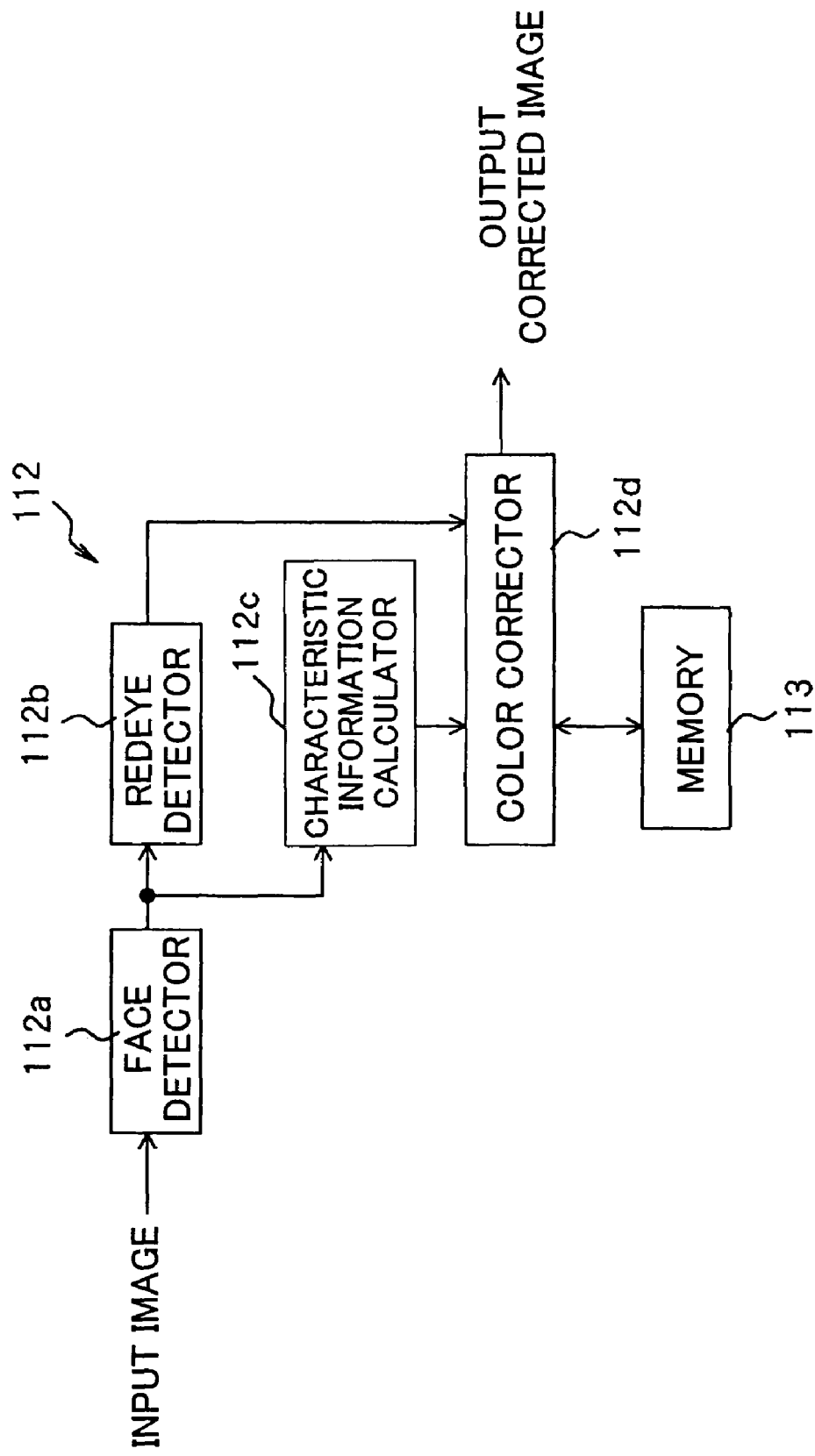
FIG. 3 is a block diagram showing a structure of a redeye correction processor in the image-taking apparatus according to the first embodiment of the present invention.

FIG. 3 shows a more detailed structure of the redeye correction processor 112. 112a is a face detector that detects a facial area of a person included in an inputted image, based on the image. The facial detection may utilize the known facial detection techniques, such as edge detection, shape pattern detection, hue extraction, and skin color extraction.

For example, Japanese Patent Application, Publication No. 2000-13788 discloses a method for segmenting a candidate area into fraction areas, comparing characteristic points with a preset facial pattern for each segmented area, and extracting the facial area based on the accuracy. Japanese Patent Application, Publication No. 2000-149018 discloses a method for extracting plural candidate areas of facial candidates, evaluating the accuracy from redundancy for each candidate area, and extracting the facial area. Japanese Patent Application, Publication No. 2000-148980 discloses a method for extracting plural candidate areas as the facial candidate, extracting the body candidate area when the concentration of each candidate area is a value corresponding to a predetermined threshold, evaluating the accuracy using the concentration and chroma contrast of the facial and bodily candidate areas, and extracting the facial area.

112b denotes a redeye detector that detects eyes in red as a first color or the redeye caused by the flashlight reflected on the retina, based on an image of a facial area detected by the face detector 112a. The redeye detection from the extracted facial area may use the known techniques, such as pupil extraction using the chroma and hue and the edge detection, shape pattern detection, positional information, hue information, etc. Other methods include a method for extracting eyes using edge detection, shape pattern detection, positional information etc., extracting low-brightness area from the brightness histogram of the image data of these eyes, retracting the extracted low-brightness area, extracting the eye area, and detecting the redeye from the chroma and hue.

For example, Japanese Patent Application, Publication No. 2000-076427 sets the facial candidate area to a xy plane and calculates an image characteristic point z using the hue etc. for each pixel. Then, this method sets a three-dimensional xyz space, divides the xy plane based on the arch distribution of z values, and detects the redeye for each divided area based on the shape information, statistic image characteristic points, etc.

The redeye detector 112b detects the entire eye area from an image of the facial area by using the edge detection, shape pattern detection, positional information, hue information etc., and may determine whether the eye is red (or redeye exists). For example, average values of hue signals Cr and Cb are calculated in the detected eye area, and the hue angle is calculated as follows:

$$\theta = \tan - 1 \frac{Cr}{Cb} \quad \text{[EQUATION 1]}$$

The existence of the redeye is determined when θ falls within a preset red angle range.

112c denotes a characteristic information calculator that generates information indicative of a facial characteristic from the image of the facial area detected by the face detector 112a. The characteristic information includes a distance between eyebrows, a distance between eyes, a profile of a face, a shape of a nose, a shape of a mouth, a color of skin, etc., and a person or individual is identified from plural pieces of characteristic information. For example, the characteristic information may include a shade of color and sharpness of a face obtained by processing the facial image using the known wavelet approach. An image pattern is generated as the characteristic information, which includes a facial characteristic part used to execute image shape recognition and pattern matching.

The detecting method applicable to the face detector 112a and the redeye detector 112b is not limited to the above methods, and may include any other known methods and those methods which will be developed in the future, as long as it can finally detect the redeye and the facial characteristic information with permissible accuracy.

112d denotes a color corrector that performs a correction process for changing the color of the redeye detected by the redeye detector 112b. This correction process will be described later.

The memory 113 stores personal information of one or more persons. The personal information includes, as shown in FIG. 4, the above facial characteristic information, such as a distance between eyebrows, a distance between eyes, a profile of a face, a shape of a nose, a shape of a mouth, and a color of skin of the person, as well as his name and the color of eyes, skin group information obtained by grouping the persons based on the color of skin, the color of eyes corresponding to the group information, etc. The memory 113 stores shot images (second images) that include the subject person with no redeye. The personal information also includes an address for storing the image.

Figure 5:
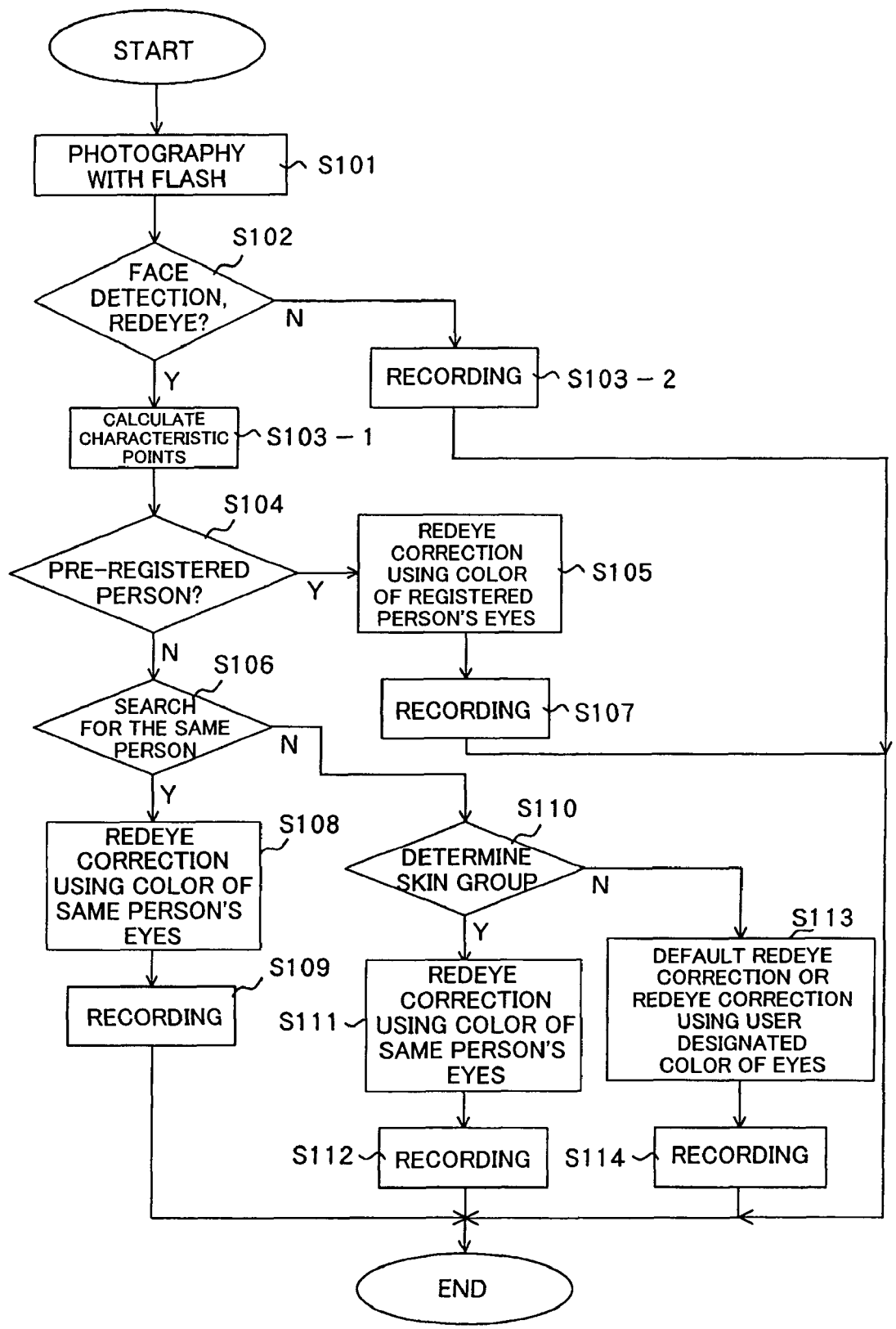
FIG. 5 is a flowchart of operations of a camera controller and redeye correction processor in the image-taking apparatus according to the first embodiment of the present invention.

FIG. 5 is a flowchart from photography to a redeye correction process executed by the camera controller 150 and the redeye correction processor 112 in the image-taking apparatus 100. While the camera controller 150 and the redeye correction processor 112 execute these processes in accordance with the computer program (or image processing program), the hardware may implement these processes. "S" in FIG. 5 denotes an abbreviation of a step.

In step S101, the camera controller 150 flash-photographs the subject by emitting the illumination unit 140 in response to the photographer's shooting switch action. Thereby, the image generator 104 generates a shot image (or image signal) as a first image.

Next, the face detector 112a detects the facial area included in the shot image in step S102, and the redeye detector 112b determines whether the detected facial area has redeye. When there is no redeye, the procedure moves to step S103-2. When there is redeye, the procedure moves to step S103-1.

In step S103-2, the CPU (not shown) records the shot image with no redeye in a recording medium.

In step S103-1, the characteristic information calculator 112c calculates the facial characteristic information from the facial area that is determined to have redeye.

In step S104, the color corrector 112d compares the characteristic information included in on or more persons pre-registered in the memory 113 with the characteristic information calculated by step S103-1. As a result of the comparison, if the personal information that includes characteristic information is identified with accuracy higher than a predetermined value, the procedure moves to step S105. When the personal information is not identified, the procedure moves to step S106. When there are plural pieces of personal information that includes characteristic information are identified with accuracy higher than the predetermined value, one piece of personal information is selected based on the highest accuracy or additional comparative information.

In step S105, the redeye correction processor 112 reads the true color of his eyes from the specific personal information detected by step S104, and uses the (second) color to correct the redeye area in the first image. More specifically, the redeye correction processor 112 replaces a color-difference signal value of the redeye area detected by step S102 with a color-difference signal value corresponding to the second color. Next, in step S107, the CPU (not shown) records the corrected image in which the redeye is corrected to the original color of his eyes, in the recording medium.

In step S106, the face detector 112a searches the shot images (or second images) of one or more persons recorded in the memory 113 for an image that has a subject person in the first image. The search in this embodiment uses the pattern matching and universal shape recognition approach with the above image pattern. When the same person is identified, the procedure moves to step S108. When the same person is not identified, the procedure moves to step S111.

In step S108, the redeye detector 112b detects the person's eyes and color of his eyes (second color) from the searched image that shows the same person, and corrects the redeye by replacing a color-difference signal in the redeye area in the first shot image with a color-difference signal of the detected color. Next, the CPU (not shown) records the corrected image in the recording medium in step S109.

In step S110, the CPU (not shown) determines the group of the subject based on the facial area and the color of the subject person's skin. For example, the CPU (not shown) determines the group of the subject using the color of his skin that is the characteristic information detected in step S103-1. When the group is determined, the color corrector 112d corrects the redeye in step S111 by replacing a color-difference signal in the redeye area with a color-difference signal of the color described as a general color of his eyes in the personal information based on the determined group of the subject. Next, the CPU (not shown) records the corrected image in the recording medium in step S112.

Figure 7:
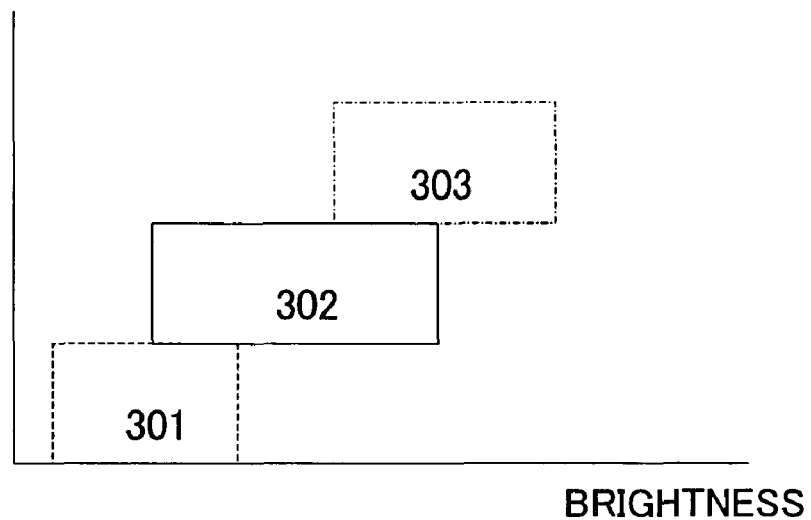
FIG. 7 is a brightness-signal grouping chart used to detect a subject area.
Figure 8:
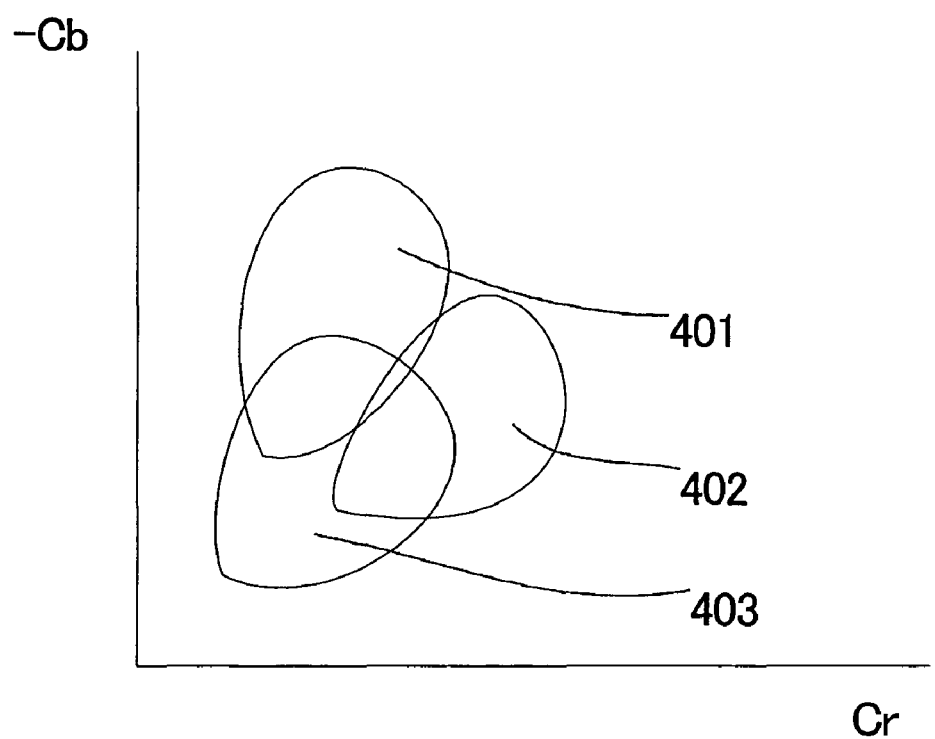
FIG. 8 is a color-difference signal grouping chart used to detect a subject area.

FIGS. 7 and 8 show grouping of the subject based on the color of skin. FIG. 7 is a chart of grouping the brightness signal for the subject based on the color condition of skin where the abscissa axis denotes a brightness value. FIG. 8 is a chart of grouping the color-difference signal for the subject based on the color condition of skin where the ordinate axis denotes a –Cb signal and the abscissa axis denotes a Cr signal.

For example, when the color of skin is whitish, it is classified into a group 303 in FIG. 7 and a group 402 in FIG. 8. When the color of skin is yellowish, it is classified into a group 302 in FIG. 7 and a group 401 in FIG. 8. When the color of skin is blackish, it is classified into a group 301 in FIG. 7 and a group 403 in FIG. 8.

Which group the subject belongs to is determined by comparing the brightness signal of skin with the groups in FIG. 7, and the chroma coordinate position of the color-difference signal of skin with the groups in FIG. 8. If each determinant designates a different group, the subject is classified into the group having a higher correlation. If the color of skin accords with none of the groups, it is regarded as a non-facial area. In order to consider the influence of the suntan on the color of skin, the grouping should consider a factor of a facial shape in the characteristic information calculated in step S103-1 in addition to the skin brightness and color-difference signals.

If the CPU (not shown) does not determine the group of the subject in step S111, the color corrector 112d corrects the redeye using the default color, such as black, or the photographer designated color in step S113. The CPU (not shown) records the corrected image in the recording medium in step S114.

When the above processes are conducted for each flash photography of a person in the image-taking apparatus, the redeye corrected image is obtained.

The above embodiment describes a flow of processes in the image-taking apparatus. When the PC governs the processes of this embodiment, the PC reads the image taken with flash from the recording medium or image-taking apparatus and conducts step S102 and subsequent steps. The corrected image may be recorded in a HDD in the PC.

Second Embodiment

Figure 6:
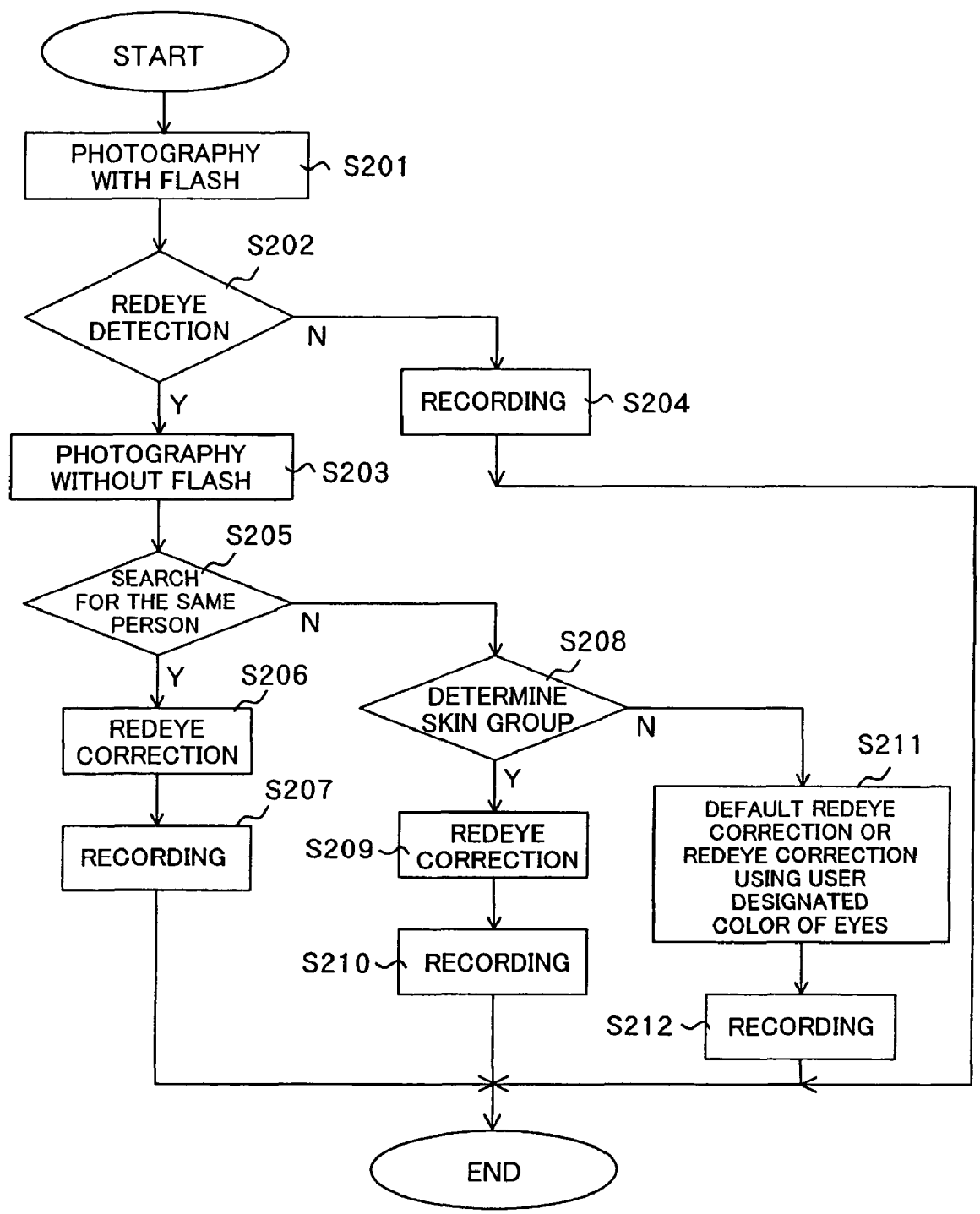
FIG. 6 is a flowchart of operations of a camera controller and redeye correction processor in the image-taking apparatus according to a second embodiment of the present invention.

FIG. 6 is a flowchart showing a flow from photography to the redeye correction process, which is executed by the camera controller 150 and the redeye correction processor 112 in the image-taking apparatus 100 of this embodiment. The image-taking apparatus that executes this process is similar to that described in the first embodiment, and each component is designated by the same reference numeral used for the first embodiment. While the camera controller 150 and the redeye correction processor 112 execute these processes in accordance with the computer program (or image processing program), the hardware may implement these processes. "S" in FIG. 6 denotes an abbreviation of a step.

In step S201, the camera controller 150 provides first flash photography of a subject, and the image generator 104 generates a shot image as a first image.

Similar to step S102 of the first embodiment, the face detector 112a next detects the facial area included in the shot image in step S202, and the redeye detector 112b determines whether the detected facial area has redeye. When there is no redeye, the procedure moves to step S204 where the CPU (not shown) records the shot image in the recording medium. When there is redeye, the procedure moves to step S203.

In step S203, the camera controller 150 conducts the second photography of the subject without flash or with less emission dose than that of the first photography.

In step S205, the color corrector 112d searches the second image for the same person as the subject from the first image. The searching method is similar to that in step S106 of the first embodiment. When the same person is identified, the procedure moves to step S205. When the same person is not identified, the procedure moves to step S208.

In step S206, the redeye detector 112b detects the color of his eyes from the second image. The color corrector 112d corrects the redeye in the first image using the (second) color. The correction method is similar to that of the first embodiment. Next, in step S207, the CPU (not shown) records the corrected image in the recording medium.

In step S207, the CPU (not shown) determines the group of the subject based on the color of his skin similar to step S110 of the first embodiment. When the CPU (not shown) determines the group of the subject, the procedure moves to step S209 where the color corrector 112d corrects the redeye in the first image based on the color of eyes in the subject group. In step S210, the CPU (not shown) records the corrected image in the recording medium.

In step S208, if the CPU cannot determine the group of the subject, the color corrector 112d corrects the redeye using the default color or photographer-designated color in step S211, similar to step S113 of the first embodiment, and the CPU (not shown) records the corrected image in the recording medium in step S212.

In step S211, the display 120 may display a warning or a speaker may emit an alarm instead of the redeye correction. This is similar to step S113 in the first embodiment.

The above series of processes for each flash photography of a person in the image-taking apparatus provides a redeye corrected image.

The above embodiment describes a flow of processes in the image-taking apparatus. When the PC governs the processes of this embodiment, the PC reads the image taken with flash in step S201, the image taken without flash, and the image taken with reduced emission dose from the recording medium or image-taking apparatus and conducts step S202 and subsequent steps except for step S203. The corrected image may be recorded in a HDD in the PC.

The second image may use images for the auto exposure ("AE") and auto focusing ("AF") obtained prior to the first photography in step S201, instead of the image of the second photography in step S203.

While the above embodiments regards the first color as red, the color of actually shot redeye is not necessarily pure red. In this case, the color of redeye taken in the image-taking apparatus is preset as a first color, and each detection process uses this color.

In steps S111 and S209, plural candidate colors of eyes are displayed so as to enable the user to select the color in accordance with the group of the subject.

The image generator 105, the face detector 112, the redeye detector 112b, the characteristic information calculator 112c, the color corrector 112d and memory 113 does not have to be installed in the same apparatus, and may be connected via wire or wireless communications so that they can communicate necessary information with each other and execute the above redeye correction flow.

The exemplary object of the present invention can be also implemented by supplying a recording medium that records the software program code tat implements the functions of the above embodiment to an image-taking system that can be controlled by the image-taking apparatus via communications or an image-taking apparatus, and by reading and executing the program code stored in the recording medium through the computer in the image-taking system or the microcomputer in the image-taking apparatus. In this case, the program code read out from the recording medium implements the function of the above embodiments, and the recording medium that stores the program code constitutes the present invention. An execution of the program code read out by the computer will implement the functions of the above embodiments. Alternatively, the operating system ("OS") that runs in the computer of the image-taking system etc. provide part or all of the actual processes based on the instructions of the program code, and the processes can implement the functions of the above embodiments.

After the program code read out from the recording medium is written in a function expanding card inserted into the image-taking system or apparatus and a memory in the function expanding unit connected to the computer of the image-taking system or the microcomputer of the image-taking apparatus, the function expanding card or the CPU in the function expanding unit etc. provide part or all of the actual processes based on the instructions of the program code, and the processes can implement the functions of the above embodiments.

The present invention is not limited to the above embodiment, and various changes and modifications can be made thereto within the sprit and scope of the present invention. Therefore, to apprise the public of the scope of the present invention, the following claims are made.

This application claims a foreign priority based on Japanese Patent Application No. 2004-176184, filed on Jun. 14, 2004, which is hereby incorporated by reference herein.

What is claimed is:

1. An image processing apparatus comprising:
a detector configured to detect a pupil with a first color in a first image generated by photography;
a memory configured to store a plurality of second images generated by photography;
a searcher configured to detect, in the first image, a shape of a face of a person having the pupil with the first color, and configured to search the plurality of second images for one image in which a same person as the person having the pupil with the first color exists by using the detected shape of the face; and
a changer configured to change the first color of the pupil in the first image to a color of the pupil of the same person as the person having the pupil with the first color in the one image; and
wherein the memory is configured to store personal information including shapes of faces and colors of pupils of a plurality of persons, the personal information being separate from the plurality of second images;
wherein the searcher is configured to detect, from the personal information stored in the memory, personal information of the same person as the person having the pupil with the first color in the one image by comparing the shape of the face detected by the searcher with the shapes of the faces included in the personal information stored in the memory; and
wherein, when the personal information of the same person as the person having the pupil with the first color in the one image is detected by the searcher, the changer changes the first color of the pupil in the first image to the color of the pupil included in the detected personal information of the same person, and when the personal information of the same person as the person having the pupil with the first color in the one image is not detected, the changer changes the first color of the pupil in the first image to the color of the pupil of the same person as the person having the pupil with the first color in the one image among the plurality of second images.

2. An image processing apparatus according to claim 1, wherein the first color is a color of redeye that occurs as a result of the photography using illumination light.

3. An image processing apparatus according to claim 1, wherein the shape of the face includes at least one of a distance between eyes, a distance between eyebrows, a profile of the face, a shape of a nose, and a shape of a mouth.

4. An image processing method comprising:
a detecting step in which a detector detects a pupil with a first color in a first image generated by photography;
a storing step in which a memory stores a plurality of second images generated by photography;
a searching step in which a searcher detects, in the first image, a shape of the face of a person having the pupil with the first color, and searches the plurality of second images for one image in which a same person as the person having the pupil with the first color exists by using the detected shape of the face,
a changing step in which a changer changes the first color of the pupil in the first image to a color of the pupil of the same person as the person having the pupil with the first color in the one image; and
wherein the memory is configured to store personal information including shapes of faces and colors of pupils of a plurality of persons, the personal information being separate from the plurality of second images;
wherein the searcher is configured to detect, from the personal information stored in the memory, personal information of the same person as the person having the pupil with the first color in the one image by comparing the shape of the face detected by the searcher with the shapes of the faces included in the personal information stored in the memory; and
wherein, when the personal information of the same person as the person having the pupil with the first color in the one image is detected by the searcher, the changer changes the first color of the pupil in the first image to the color of the pupil included in the detected personal information of the same person, and when the personal information of the same person as the person having the pupil with the first color in the one image is not detected, the changer changes the first color of the pupil in the first image to the color of the pupil of the same person as the person having the pupil with the first color in the one image among the plurality of second images.

* * * * *